April 5, 1938.  J. C. SANDERS  2,113,143
AIRCRAFT GUN MOUNT
Filed Oct. 17, 1934  8 Sheets-Sheet 1
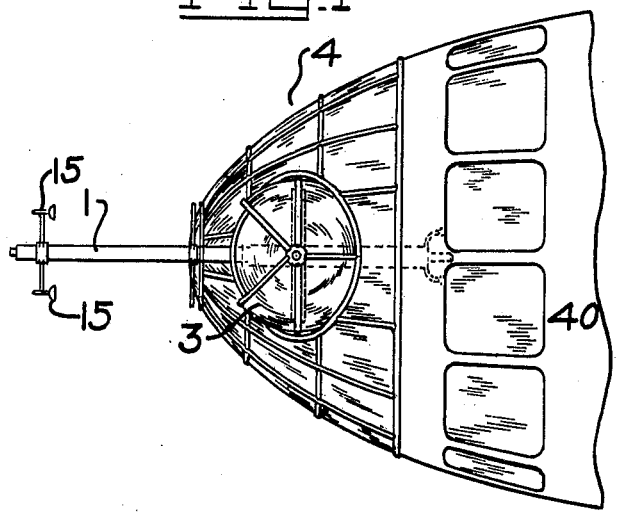
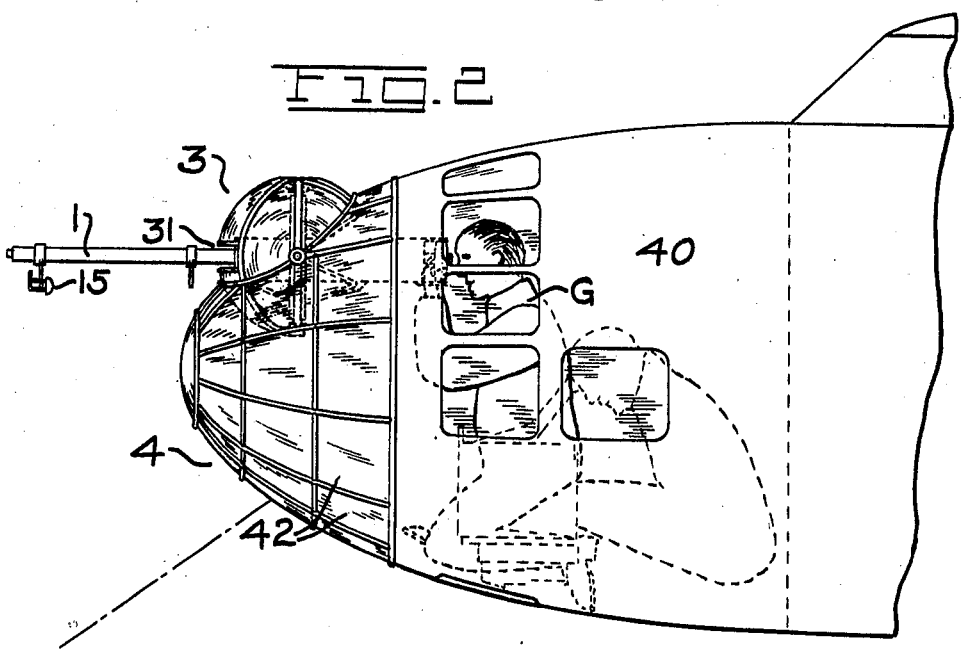
Inventor
John C. Sanders
By Charles L. Reynolds
Attorney

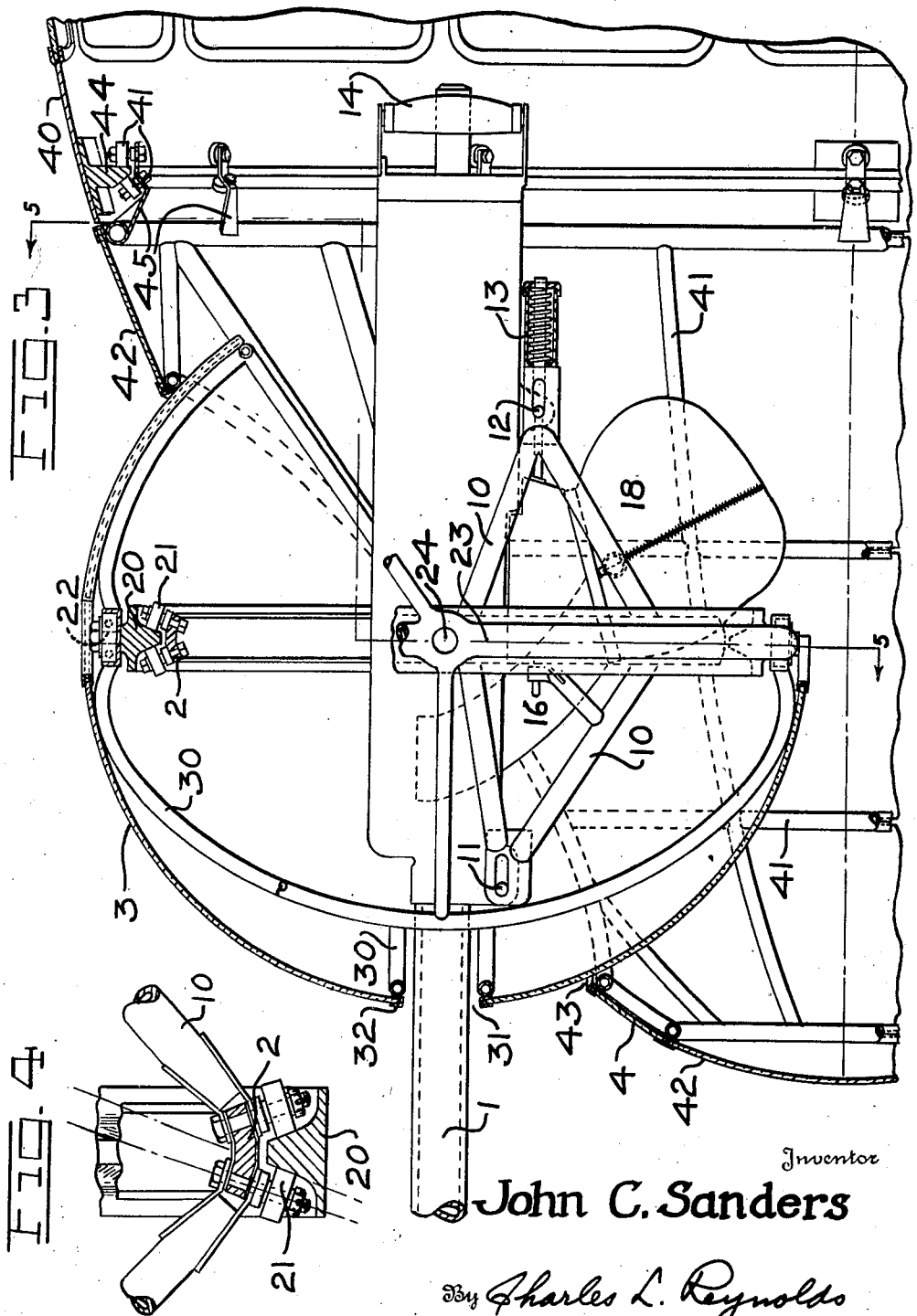

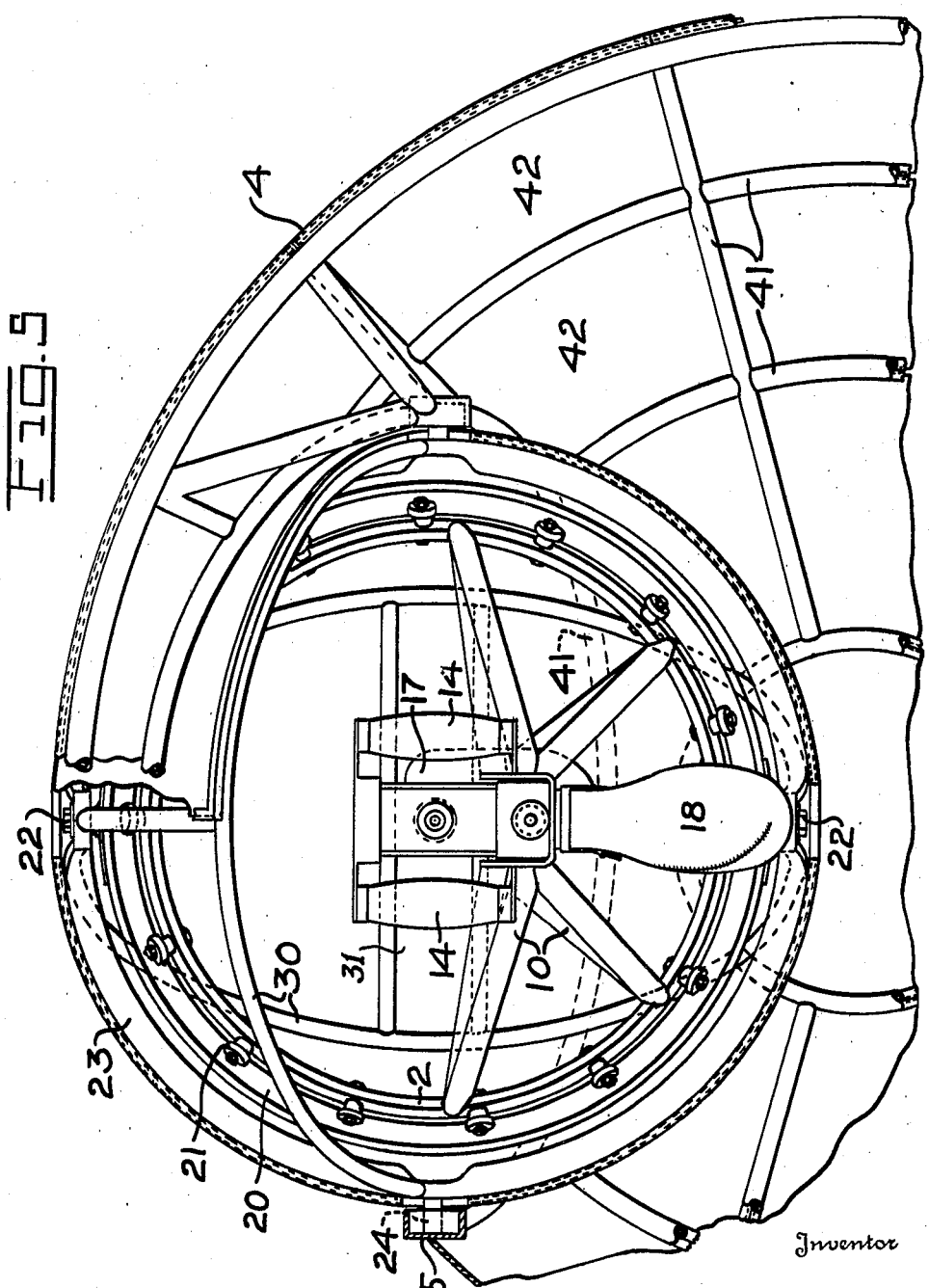

April 5, 1938. J. C. SANDERS 2,113,143
AIRCRAFT GUN MOUNT
Filed Oct. 17, 1934 8 Sheets-Sheet 4
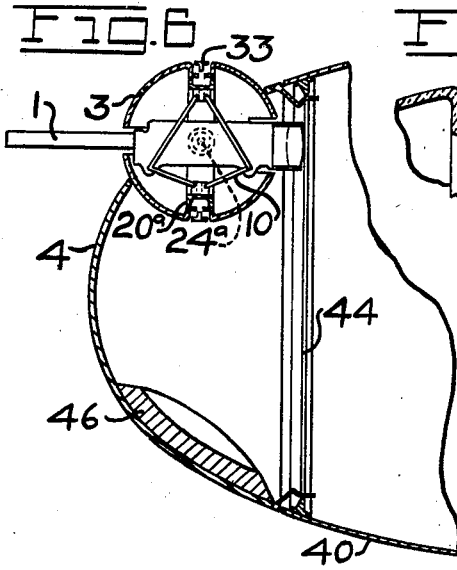
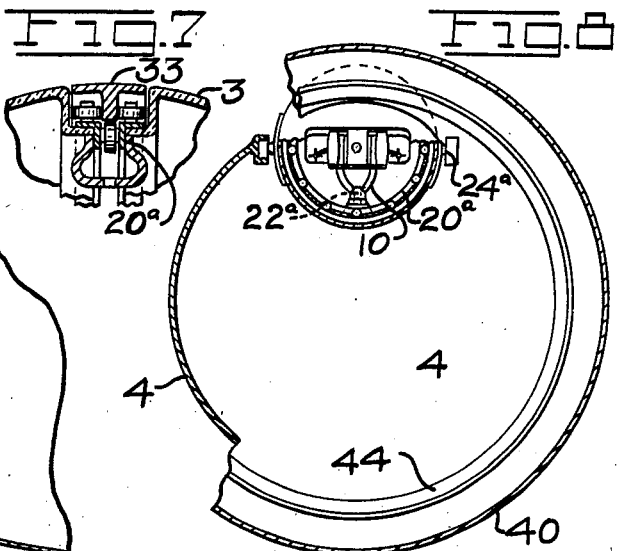
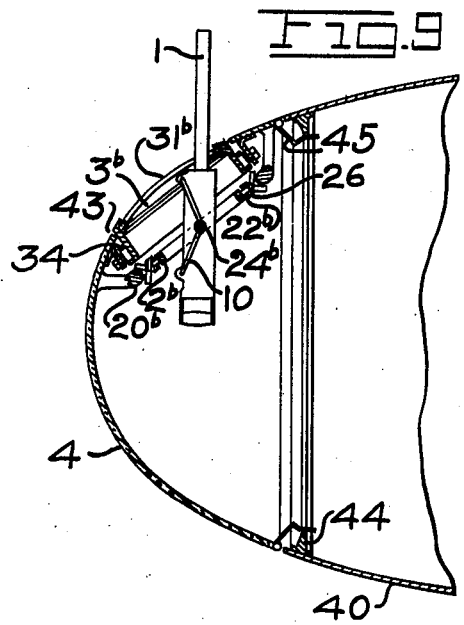
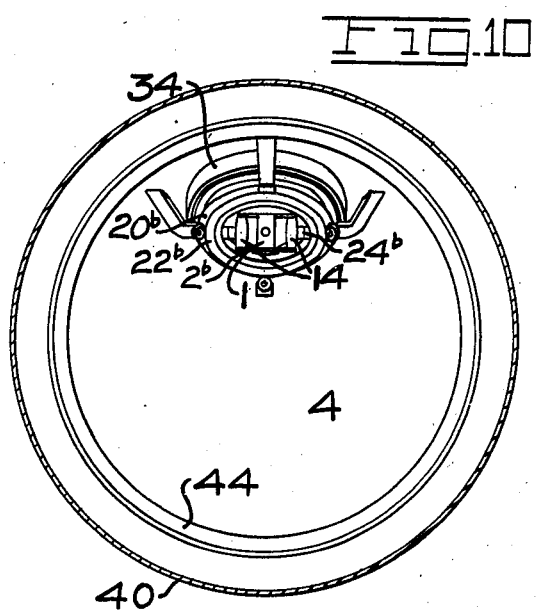
Inventor
John C. Sanders
By Charles L. Reynolds
Attorney April 5, 1938. J. C. SANDERS 2,113,143
AIRCRAFT GUN MOUNT
Filed Oct. 17, 1934. 8 Sheets-Sheet 5

Inventor
John C. Sanders
By Charles L. Reynolds
Attorney

April 5, 1938.   J. C. SANDERS   2,113,143
AIRCRAFT GUN MOUNT
Filed Oct. 17, 1934   8 Sheets-Sheet 6

Inventor
John C. Sanders
By Charles L. Reynolds
Attorney

April 5, 1938.  J. C. SANDERS  2,113,143
AIRCRAFT GUN MOUNT
Filed Oct. 17, 1934  8 Sheets-Sheet 7
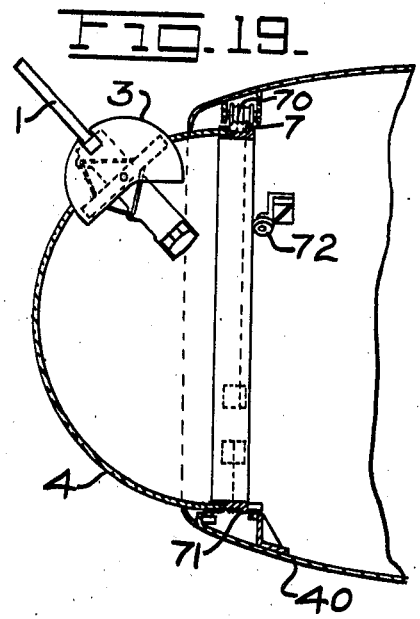
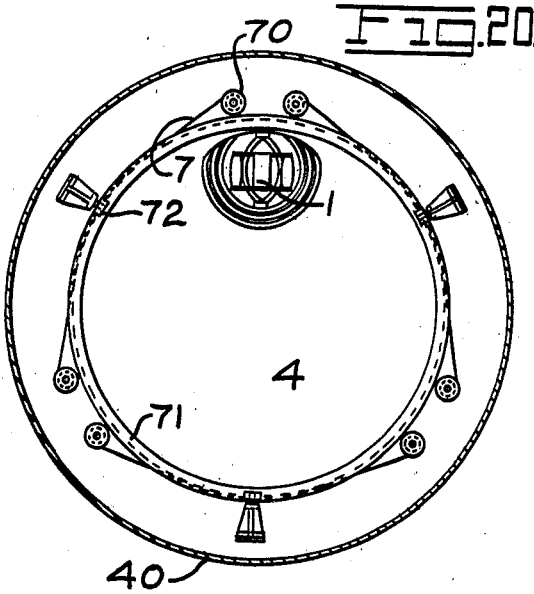
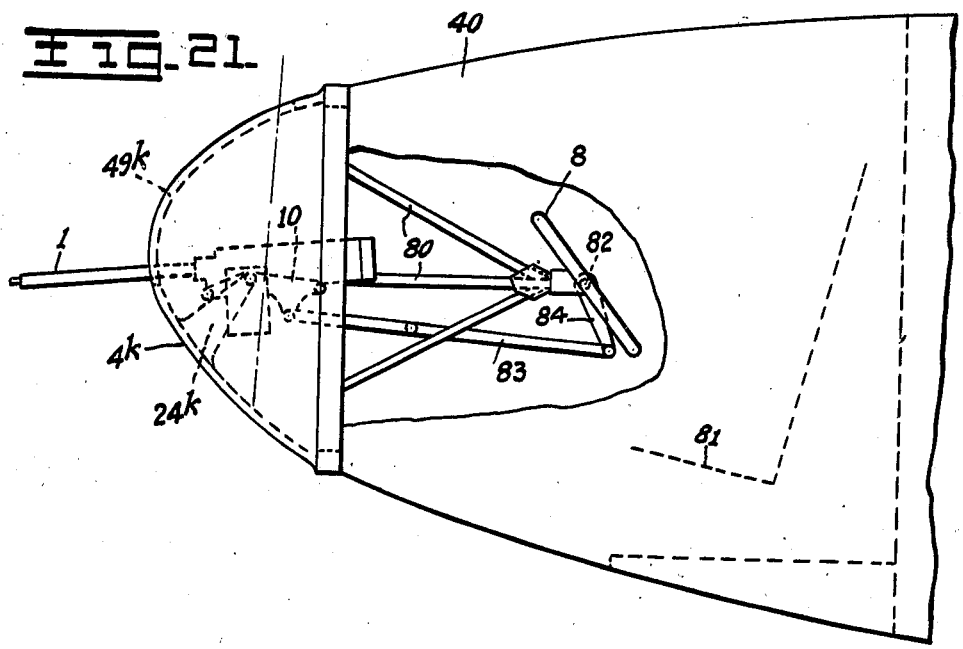
Inventor
John C. Sanders
By Charles L. Reynolds
Attorney April 5, 1938.  J. C. SANDERS  2,113,143
AIRCRAFT GUN MOUNT
Filed Oct. 17, 1934  8 Sheets-Sheet 8
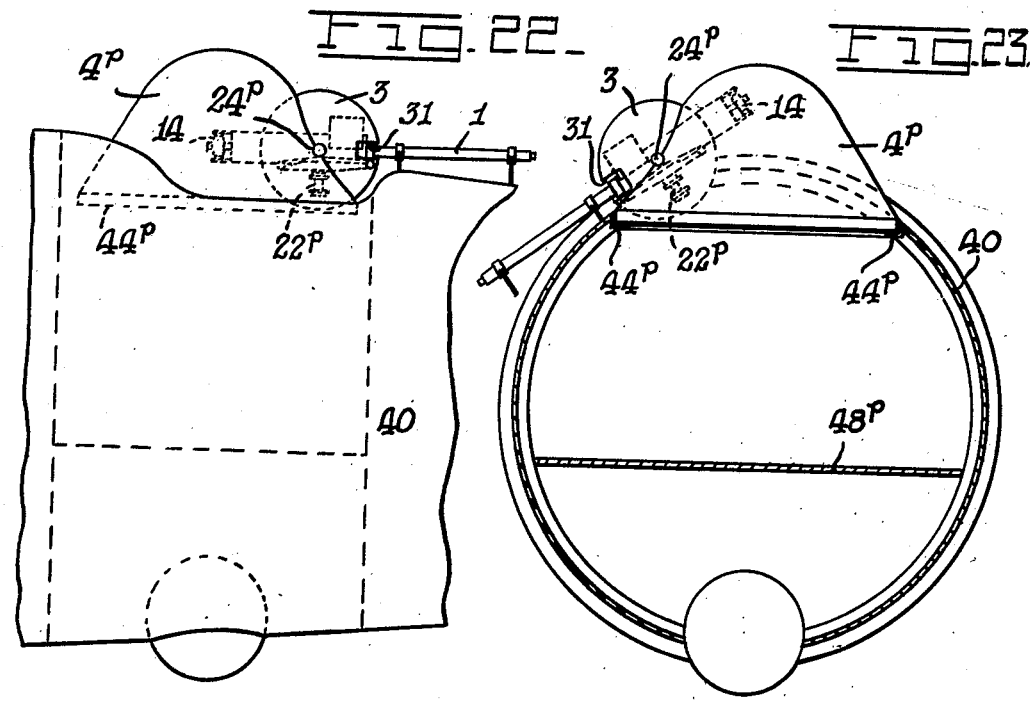
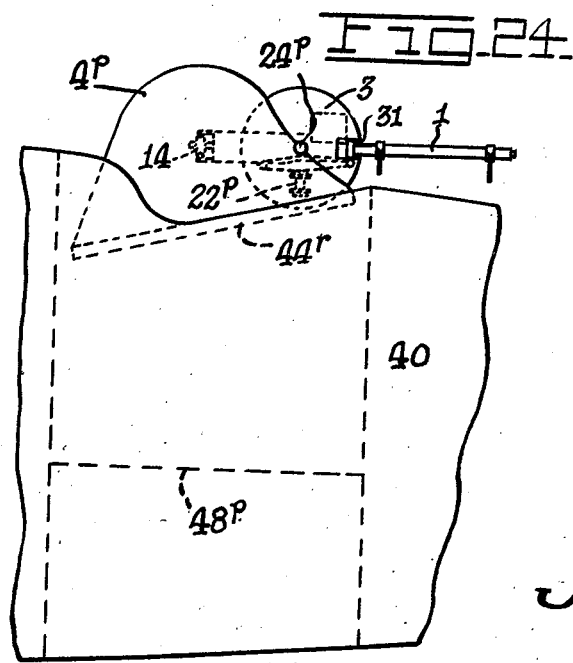
Inventor
John C. Sanders
By Charles L. Reynolds
Attorney Patented Apr. 5, 1938

2,113,143

UNITED STATES PATENT OFFICE 2,113,143

AIRCRAFT GUN MOUNT

John C. Sanders, Seattle, Wash., assignor to Boeing Aircraft Company, Seattle, Wash., a corporation of Washington Application October 17, 1934, Serial No. 749,040

25 Claims. (Cl. 89—37.5)

This invention relates to aircraft, and more particularly to a mounting for guns, such as machine guns, upon an aircraft. While the term "aircraft" will include a lighter-than-air ship, such guns are usually mounted upon airplanes, and the invention will be described with relation to airplanes, remembering that the principles of the invention may be applied to other aircraft.

This application is a continuation in part of my application Serial No. 733,590, filed July 3, 1934.

Aside from fixedly mounted guns it has been customary heretofore to mount guns upon an airplane by supporting them at or near the edge of an open cockpit, in such manner that they could be elevated and traversed, and frequently in such manner that they could be moved from one part of the cockpit edge to another part. In most cases, however, where the gun had any degree of mobility, the cockpit, within which the gunner stood and within which the gun was mounted, was substantially horizontal and open to the wind stream. The effect of mounting the gun within a cockpit open at the top was that the gun could not fire directly beneath the cockpit, but could only fire downwardly, ahead, or in some instances somewhat to each side, of the cockpit; consequently there was a blind spot immediately beneath the cockpit which could not be protected by the gunner. The effect of providing an open cockpit was to seriously increase the drag on the plane, for the flow of the wind stream was interrupted by the necessary contour of and by the opening forming the cockpit, to the extent that the speed of the plane was reduced over that possible of attainment if all parts were streamlined or faired into the general contour of the body or nacelle, and because such a cockpit was of necessity located at the nose of the body, the nose could not be shaped to the best advantage to reduce drag.

In addition, because of the necessity of the gunner rising in the cockpit to control and fire the gun, there was added a further element of drag to the plane, and the gunner, standing exposed to the wind stream, was hampered in his movements, and could not control the gun as well or as accurately as if he had not been subjected to the influence of the wind stream.

Such drawbacks were not of particular moment in planes of the type heretofore employed, since they were overshadowed by other elements to the extent that even if they were eliminated the plane would still be too slow to make the elimination of these drag-producing elements of any particular consequence. Present-day airplanes of the type which mount mobile guns, for instance bombers, have been improved to the point where they are capable of holding their own and matching speed with the fastest pursuit planes, their tactical enemy. In such bombers the drag produced by the old style open cockpit gun mount became a serious factor, and one of the objects of the present invention is to eliminate the drag thus produced because of the opening, because of the location and because of the necessary contour of the cockpit, thereby adding to the effective speed of the airplane, for as will be recognized, it is most essential that a bomber be able to get away quickly once it has launched its bombs, so that it may regain the shelter of friendly territory and its supporting pursuit ships before opposing pursuit ships may be launched and may reach it.

Furthermore, in bombers with greatly increased speed the difficulties of handling the gun are tremendously increased purely by the increased speed and pressure of the relative wind stream, and it becomes more than ever necessary to protect the gunner from the effect of this wind stream, that his handling of the gun may not be hampered. This, then, is a further major object of this invention.

In accomplishing one or more of the objects indicated above it is a further object of my invention to provide a mount for a gun in the nose of an airplane or element of an aircraft structure, in which the gun may be moved in conjunction with the nose piece into positions to fire above, below, or to either side of the nose piece, so that by a movement or combination of movements of the gun and/or nose piece the gun may be made to cover a sector of fire approximating or in some instances exceeding a hemisphere, thus effectively protecting the plane from an enemy beneath it or even to the rear and beneath it.

Since a machine gun mounted in an airplane is conveniently fed from an ammunition container located above the gun, and links joining them and the fired shells, when discharged, drop downwardly, it is desirable that the gun be maintained substantially upright so that the bullets will feed properly and so that the fired shells and the links will not fall back into the gun mechanism and jam it. With a gun so flexibly mounted as is indicated above it is desirable to provide a mount whereby the gun and its ammunition container and the receiver for spent shells and links, if one is employed, may be maintained in a substantially normal attitude regardless of the attitude of the plane or of the gun with respect to the plane.

It is an object to provide a mount for guns upon an airplane structure in which the gun mount is rotatable about a longitudinal axis instead of the normal vertical axis, yet to provide an enclosure or shell for the gun which will protect the gunner, and which by being faired into the airplane structure will reduce drag, which otherwise would be caused by the open space within which the gunner stands, to a minimum.

It is a further object to provide what is in effect a gimbal mounting for airplane guns, with which is or may be associated a spherical shield or enclosure, whereby the gun may project through a skin forming part of the airplane structure, to the end that it is readily traversed and elevated, yet there is no appreciable opening left to catch the relative wind stream and to produce drag, and further, to provide such a gimbal and spherically protected mounting which is readily applicable to various parts of the airplane, either as a nose gun or as a gun mounted along the side of the fuselage.

It is believed that these and other objects of my invention, particularly those which relate to details of structure, will be understood as this specification progresses, and from study of the accompanying drawings, wherein the principles of my invention are illustrated in various forms, and will be further understood by reference to the appended claims.

The principles of my invention will be illustrated in conjunction with an airplane structure, such as the fuselage of a bombing plane, but it should be borne in mind that these principles are equally applicable to other aircraft structure, as for example the gondola or gas bag of a dirigible, or the nacelle of an airplane.

My invention will be disclosed, both broadly and in the various specific embodiments, in the accompanying drawings and in this specification, and the extent thereof will be defined by the claims which terminate this specification, and I do not desire to be restricted, especially do I not desire to be restricted as to specific forms which are shown by way of illustration, except as required by the claims.

Figure 1 is a plan view, and Figure 2 is a side elevation of the nose portion of an airplane fuselage incorporating my invention in its present most preferred form as applied to a nose gun.

Figure 3 is a broken away elevation, the section being taken substantially along the axis of the gun, illustrating in detail this form of mount.

Figure 4 is a detail section of the track employed in the gimbal mounting of the gun, illustrating the method of adjustment.

Figure 5 is a section through the nose shell and sphere, taken from the inside and looking forward, along two transverse lines, illustrated by the line 5—5 of Figure 1.

Figure 6 is a sectional view through a modified form of mount, corresponding closely to the mounting illustrated in my application Serial No. 733,590, referred to above.

Figure 7 is a detail sectional view of the gimbal mount for the gun which is illustrated in Figure 6.

Figure 8 is a transverse sectional view, looking forward from the inside and illustrating the mounting shown in Figures 6 and 7.

Figure 9 is a longitudinal section, and Figure 10 a transverse section from the inside looking forward, showing a further modified form of mount.

Figure 15:
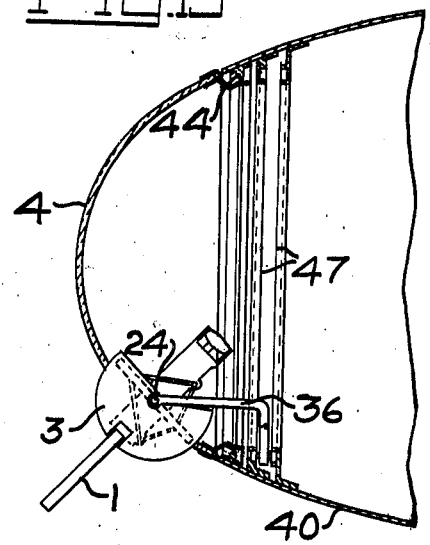
Figure 16:
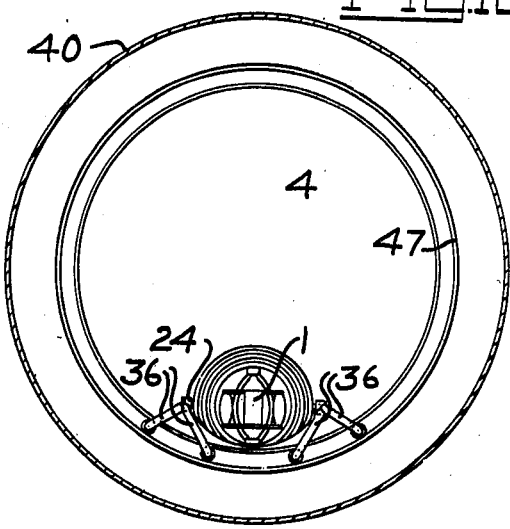
Figure 17:
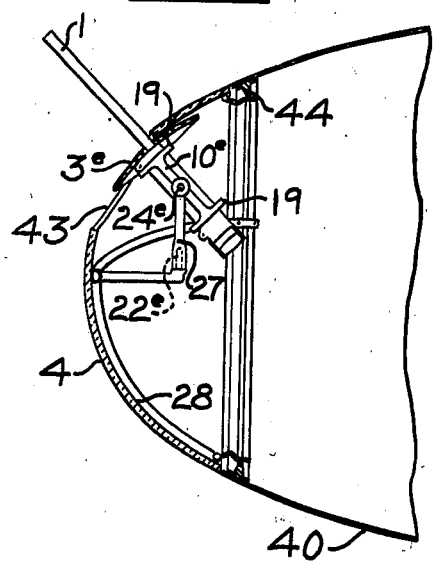
Figure 18:
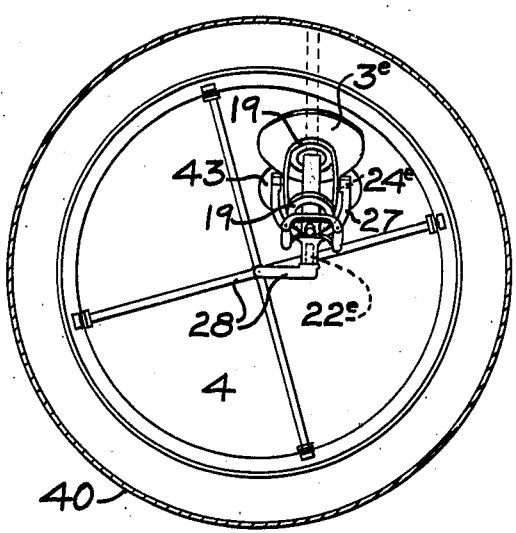

Figure 15 similarly corresponds to Figure 9, and Figure 16 to Figure 10, and Figure 17 corresponds to Figure 9 and Figure 18 to Figure 10, these figures illustrating further modifications.

Figure 19 is a vertical longitudinal sectional view, and Figure 20 a vertical transverse sectional view, from the inside looking forward, of a further modification, chiefly in the method of mounting the nose shell.

Figure 21 is a side elevation, partly broken away, showing a further modification equipped for distant control of the gun.

Figure 22 is a side elevation, and Figure 23 a transverse vertical section of my invention, showing the enclosure in elevation, as applied to a rear gun, and Figure 24 is a side elevation showing a slight departure from the form of Figures 22 and 23.

The principles of my invention will be best understood after typical structural forms have been explained. These forms will therefore be described in detail, it being understood, however, that this is done by way of illustration rather than by way of restriction.

Reference is made first to Figures 1 to 5 inclusive. The machine gun 1, as illustrated in these figures, is mounted directly upon a mount 10 secured to the gun at the points 11 and 12, preferably through recoil mechanism illustrated at 13, the connections at the points 11 and 12 permitting axial movement of the gun to give effect to the recoil mechanism. The gun is provided with spaced handles 14 by which its movements can be controlled, and with the usual firing mechanism (not shown). Side sights are indicated at 15, though any suitable sighting mechanism may be employed. The ammunition container (not shown) is intended to be mounted above the gun in the usual position, and chutes 16 and 17, to receive the shells and the links respectively, lead to a receiver 18 which is in the form of a bag closed by any suitable means, such as a hookless fastener.

The gun mount 10 is mounted with respect to its immediate support in such a way as to rotate substantially about the axis of the gun to traverse the gun laterally, and to elevate it or depress it vertically. These movements may occur simultaneously, giving the gun a universal movement. Various types of mounting might be employed to accomplish these ends, and different types have been illustrated in various figures of the drawings. For instance, compare the form of Figures 1 to 5 inclusive with the form illustrated in Figures 6, 7, and 8. However, the form which at present I prefer over others is shown in Figures 1 to 5 inclusive, wherein the gun mount 10 is secured to or formed as part of a ring 2. This ring is rotatable with respect to a circular track 20, engagement between the ring 2 and track 20 being maintained by a plurality of rollers 21. As is particularly seen in Figure 4, these rollers are preferably mounted at an angle, the track 2 being disposed at nearly but not quite the same angle, so that by axial adjustment of one or both of the rollers of a pair compensation may be made for wear or for looseness otherwise occurring. The angular disposition of the track enables it to resist radial and longitudinal stresses. This arrangement accomplishes the rotational movement of the gun about its own axis.

To accomplish traversing movement, the track is provided with trunnions 22 at top and bottom, by means of which it is mounted for swinging movement about an axis which may be termed the vertical axis with respect to another ring 23, which in turn is provided with opposite trunnions disposed at right angles to the axis of the trunnions 22, and supported in bearings at 25 upon a suitable support, for tilting about what may be termed a horizontal axis. By tilting upon the trunnions 24 the gun may be elevated or depressed.

In many instances it is convenient to enclose the gun mount within a shield which may be formed as the greater part of a sphere, generally referred to as a sphere, and indicated by the numeral 3, the center of which sphere is substantially at the intersection of the gun's rotative axes. Such a shield or sphere may be made up of light framework, of which the ring 23 may form a part. This framework is generally indicated by the numeral 30, and there may be provided a generally transverse slit 31, through which the muzzle of the gun projects. Inside or at the rear end of the gun the surface of the sphere may be more widely interrupted to give freer access to the ammunition container, to the shell and link receiver 18, and for sighting. This is best seen in Figure 3. The sphere may then be completed by supporting upon the framework 0 curved plates of preferably transparent material, such as plastacelle, this being mounted in any convenient manner, as, for example, by receiving its edges in channels 32 secured to the framework 30, whereby the exterior surface of the spherical enclosure is substantially smooth. The entire sphere, being supported from the framework which includes the ring 23, is swingable upon the trunnions 24, and the gun inside of it may be swung for traversing movement within the slot 31 about the pivots 22, or may be rotated bodily about its own axis, guided by the track 20 as explained heretofore, with respect to the sphere and the slot 31.

The gun, thus mounted, may be supported in various ways. The preferred mounting is shown in Figures 1 to 5 inclusive. The fuselage 40 of the airplane is generally stream-lined, but at the nose end is left a large aperture, preferably of circular shape and disposed in a vertical plane normal to the line of flight. Such an aperture, if left open to the wind stream, would very seriously retard the plane. Therefore, to close in this aperture I provide an enclosure or shell, generally designated by the numeral 4, which completes the streamline form of the nose of the airplane structure or fuselage 40, and closes the aperture referred to. While this shell may be of any suitable form or material, or constructed in any suitable manner, I prefer that it be, like the shield or sphere 3, a skeleton of tubing, as indicated at 41, covered over by a substantially smooth, unbroken covering of plastacelle, indicated by the panels 42, or like transparent material, so that the gunner G may have clear vision throughout substantially a hemisphere by projecting his head into the shell 4.

Such a shell is provided with an opening 43 of a size and shape to exactly receive the enclosure or sphere 3. In this instance the trunnions 24 which support the sphere are received in the shell 4. Thus it will be evident that the sphere may tilt upon these trunnions and within the opening 43, and may fit sufficiently closely within that opening that there is no appreciable space left for the entrance of air (or any gap may be suitably packed and closed), and the portion of the sphere which projects outside the shell 4 is in effect faired into the streamlined portion of the shell and fuselage.

Even were the sphere to be mounted directly in the nose of such a shell it would be difficult, because of the length of the gun and the limitations of space within the nose portion of the shell, to give the gun sufficient movement to permit it to cover a hemisphere of fire. I prefer, therefore, that the sphere be mounted at one side of the axis of the fuselage and shell 4, and that the shell be mounted for rotation about its own axis, which is generally the axis of the fuselage, to the end that by the combined relative movements of the gun, sphere and shell the gun may cover any sector within substantially a hemisphere, yet may always be in proper firing attitude, with relation to gravitational pull. When the shell 4 is rotated about its axis in either direction from the position shown in Figures 1 to 5 through an angle of 90°, the sphere 3 occupies a position in a line horizontally through the shell's axis. Similarly if the plane should execute a vertical bank while the shell is in the position relative to the fuselage shown in Figures 1 to 5, the sphere and shell's axis would define a horizontal line. In either of these situations, in order that the gun may operate properly, it must be kept in its normally upright position. Hence when the sphere 3 is disposed in a horizontal line with the axis of shell 4, the gun must be rotated about its longitudinal axis, guided by the track 20, through an angle of 90° from the position shown in Figures 1 to 5. In this position of the parts, the traversing action, or swinging of the gun in a horizontal plane is accomplished by swinging the entire sphere on the trunnions 24. The elevational movement, or swinging of the gun in a vertical plane, is accomplished by swinging the ring 2 and track 20 upon trunnions 22.

Thus the trunnions 24, allowing traversing movement of the gun in this position, are the ones which allow elevational movement of the gun in the position of the sphere 3 and shell 4 in Figure 5. Similarly the trunnions 22, which enable the gun to have elevational movement in this position, are the ones which provide traversing movement of the gun with the parts in the positions shown in Figure 5. In any intermediate rotative position of the shell 4, namely, one in which a line through its rotative axis and the sphere 3 will be other than vertical or horizontal, and the gun is rotated about the track 20 to its normally upright position, it will be apparent that traversing and elevational movements may be accomplished by a combination of rotations about trunnions 22 and 24. Angular movement of the gun in any one direction may be so slightly limited, if desired, that the gun may cover substantially a hemisphere of fire.

Any suitable means of mounting the shell to execute the movements described may be employed. As shown, there is provided a track 44 upon the fuselage having a radial face and a face disposed at an angle thereto, with which faces are engaged pairs of rollers 41, corresponding generally to the rollers 21 previously described and similarly adjustable, these rollers being supported upon brackets 45 secured to the framework of the shell 4. The off-center weight of the gun, ammunition and sphere would normally be counterweighted, as by weighting the tubes of the shell opposite the gun (see, for example, the counterweight 46 diagrammatically shown in Figure 6), whereby by moving the gun under control of the handles 14 it can be given any of the movements permitted by the sphere and associated parts, and the entire shell 4 may be rotated about the track 44. By this combination of movements the gunner may cover the entire hemisphere forward of the track 44, and may even fire somewhat to the rear of the plane of the track. Notwithstanding the position of the gun, the ammunition container may always be kept generally above the gun, and the shell receiver 18 may be kept below it.

In the airplane shown in Figures 1 and 2 the gunner G may also be the bomber, and in dotted lines is shown his position while controlling the bombs. Various windows, suitably enclosed with plastacelle or like material, are provided for vision of this man, whether operating as gunner or as bomber.

The remaining figures in general illustrate the application of the principles of my invention in different ways or to different conditions or situations. Thus in Figures 6, 7 and 8 the gun mount 10 is pivotally mounted upon the axis 22$^a$ for swinging movement upon a ring 20$^a$, the ring 20$^a$ being formed as part of the framework of the sphere 3, and the entire sphere is rotatable about a track 33 recessed into the sphere, which is pivotally mounted upon the shell 4 upon the axis 24$^a$, a chord of the shell parallel to the plane of the tracks 44. The same results are accomplished as in the first-described form, and in other respects the structure is or may be substantially identical with that heretofore described. For clearer illustration the details of the structural framework have been omitted, and the views are largely diagrammatic.

In some instances it may be preferred not to permit even a portion of the shield to interrupt the streamline contour of the shell 4. Thus in Figures 9 and 10 the gun 1 is tiltably mounted upon the axis 24$^b$ upon the ring 2$^b$, which in turn is swingable with relation to the ring 26 upon an axis 22$^b$ at right angles to the axis 24$^b$, and the ring 26 in turn is rotatable about a path defined by rollers 20$^b$, which path is inclined at an angle of 45° to the opening of the shell 4. Within the aperture 43 is rotatably supported an enclosure or shield 3$^b$ having merely a slot for the extension of the gun, this enclosure being rotatably guided in a track 34 for rotation in a plane which is generally parallel to the plane defined by the several rollers 20$^b$. The gun may be swung in the slot 31$^b$ in the shield, and by rotating the gun upon its mounting it will act as a lever to rotate the shield 3$^b$, so that the slot 31$^b$ may be extended vertically, transversely, or at any intermediate angle. Thus the shield 3$^b$ may form in effect a part of the streamlined structure of the shell, yet the gun may be given the same movement with respect to the shell as in the former mounting, and by movement of the shell itself, combined with movement of the gun, the gun may be given a field of fire substantially equivalent to that provided by the mounting first described.

Figure 11:
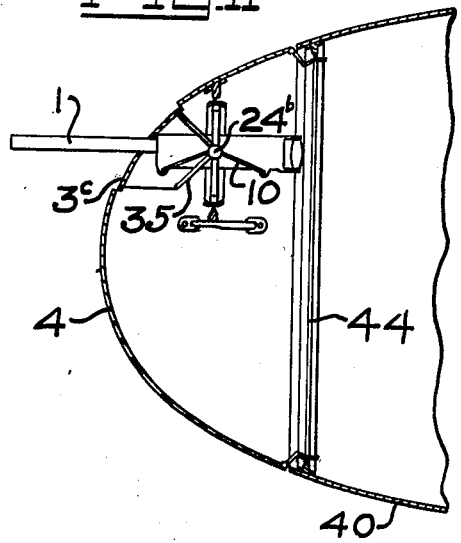
Figure 11 is a section corresponding to Figure 9, and Figure 12 a section corresponding to Figure 10, showing a different mount, and Figure 13 corresponds to Figure 9, and Figure 14 to Figure 10 in illustrating a further modification.
Figure 12:
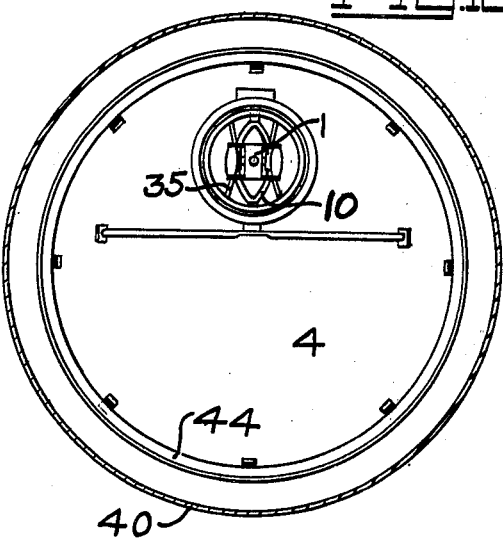
Figure 13:
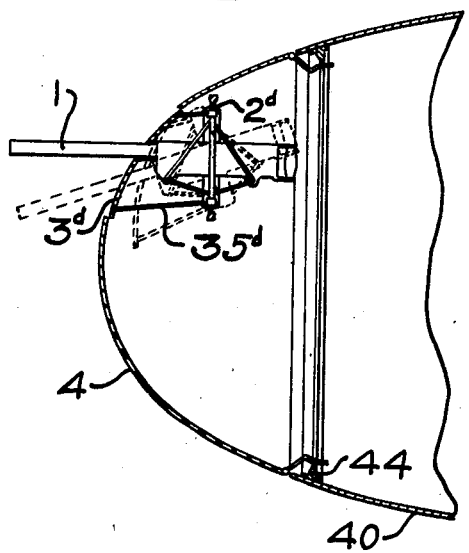
Figure 14:
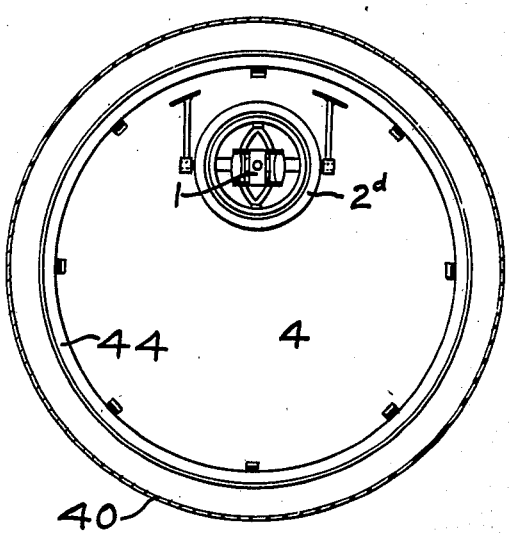

A somewhat similar arrangement is illustrated in Figures 11 and 12, the chief difference being that the enclosure or shield, designated 3$^c$ to distinguish it, is not rotatably mounted, but is carried by arms 35 connected directly to the gun mount 10, and therefore it is tilted and traversed by corresponding movement of the gun. In this form the shield 3$^c$ lies just inside the shell 4, and while it substantially closes the streamline aperture of the shell when the gun is in the position shown in Figure 11, it would leave a gap wh( tilted, unless it is extended farther than is shov in order to close such a gap.

A modification of this idea is shown in Figur 13 and 14, where the shield, designated 3$^d$ in ord to distinguish it, is supported by arms 35$^d$ fro the rotatable track 2$^d$. This track is tiltable t( wards and from the axis of the shell 4, but not tiltable in a plane at right angles, but tl gun is tiltable in such a plane; therefore, whi the shield 3$^d$ is depressed or elevated by mov( ment of the gun, the gun swings laterally wit respect to the shield 3$^d$, the latter having a sl( of sufficient extent to permit this traversing a( tion of the gun.

The arrangement shown in Figures 15 and 16 substantially the same as that shown in Figure 1 to 5 inclusive, except that the shield or sphere supported from the fuselage 40 rather than fror the shell 4, and the shell merely follows move ments of the gun about the axis of the fuselag by reason of the engagement of the sphere within the aperture of the shell. The shel therefore, does not need to be counterweightec This support may be provided by a supplementa track 47, within which is guided one end of bracket 36 to which the sphere is pivotally mount ed upon the axis 24. The arrangement is or ma; be otherwise the same as that shown in Figure 1 to 5. Obviously the sphere, considered as whole, is fixedly positioned except as it ma; rotate about the axis of the fuselage around th( track 47, and since the shell 4 is similarly fixed but rotatable, rotation of the sphere around th( axis of the fuselage will cause corresponding ro tation of the shell about the same axis, yet be cause the sphere may tilt on one axis, and th( gun on another axis, the gun may be traversec and elevated in all respects as was the case witt the form first described.

In the form shown in Figures 17 and 18 the gun mount 10$^e$ is provided with two bearings 19 within which the gun is received for rotation about its own axis, and to the gun is fixed the shield 3$^e$, which in one position of the gun substantially fills the aperture 43 in the shell. The mount is tiltable about an axis 24$^e$ upon a post 27, which in turn is rotatable about an axis 22$^e$ placed off center from the axis of rotation of the shell, and supported either from the shell or upon the track 44, as may be preferred, by framework generally designated by the numeral 28.

The arrangement shown in Figures 19 and 20 is similar to that illustrated in Figures 1 to 5 inclusive, except that the shell 4 is suspended by a plurality of cables 7 passing about pulleys 70 carried by the fuselage, these cables each passing part way about what is in effect a pulley 71 formed at the rear or inner end of the shell 4. The shell is thus suspended by these cables 7 for rotational movement, and axial thrust may be assumed by stop rollers 72 mounted within the fuselage and engaging the rear end of the shell.

In Figure 21 the gun 1 upon its mount 10 is tiltable upon the transverse axis of the support 24$^k$, which is fixed to the enclosure 4$^k$. The shell is provided with a substantially 90° arcuate slot 49$^k$, although the slot may be a substantially 180° slot, if desired, and the shell 4$^k$ is rotatably mounted upon the fuselage 40, as in forms previously described. By a combination of rotational movement of the enclosure 4$^k$ and the movement of the gun about the trunnion mount 24$^k$, substantially a hemisphere of fire may be accomplished.

This particular arrangement contemplates that the gunner shall remain seated in his chair 81, and shall control the gun by distant control means. To this end there is provided a wheel 8 secured to a spider 80 connected to the enclosure 4$^k$ to rotate it, so that by rotation of the wheel 8 the shell 4$^k$ is rotated. The wheel 8 is tiltably mounted at 82, and a link 83 connects an arm 84, tiltable with the wheel, to the gun mount 10, so that by rocking the wheel upon its pivot 82 the gun may be elevated and depressed. Since the shell 4$^k$ may be rotated until the slot 49$^k$ is substantially horizontal, the movement in this case, accomplished by tilting the wheel 8, would partake of the nature of a traversing movement. Hence it is more correct to say that tilting of the wheel 8 will swing the gun, and rotational movement of the wheel will revolve the shell 4$^k$.

In each of the forms so far described, all of which illustrate a nose mount, it will be evident that the gun is mounted in a member supported from the fuselage or from another member which in turn is supported from the fuselage, the gun-supporting member having a zone of circular shape whereon it is rotatable or swingable. The same principles can be incorporated in guns which are mounted otherwise than in the nose, and such arrangements are shown in Figures 22 to 24 inclusive. Referring particularly to Figures 22, 23, and 24, the gun 1 is shown in these figures as mounted in a sphere 3, which may be identical in construction and mode of operation to that described in connection with Figures 1 to 5 inclusive. It is mounted, however, upon a rotative enclosure or shell 4$^p$ which is mounted in the fuselage 49 for rotation about a generally upright axis. The slot 31 extends transversely, and the gun is mounted for rotation about an upright axis 22$^p$, the sphere being tiltable about the transverse axis 24$^p$ for elevating and depressing. The shell 4$^p$ is carried by a track 44$^p$ within the fuselage, for rotation about its upright axis, and the gunner may thus stand upon a floor 48$^p$, with his head and shoulders within the enclosure 4$^p$, and may traverse the gun either by swinging it on the axis 22$^p$ or by rotating the enclosure 4$^p$, or both, and may elevate and depress the gun by swinging it with the sphere upon the axis 24$^p$. In Figure 24 the track 44$^r$ is mounted at an angle to the vertical axis of the fuselage, so that a better upward and forward field of fire is obtained, or if the gun is pointed to the rear, the field of fire will be rearward. One such gun, so mounted, can cover the whole field of fire available to the normally ring-mounted gun, yet the gunner is protected and drag is decreased.

In most of the drawings the showings have been largely diagrammatic. Windows, framework, and structural details, have largely been omitted, or indicated only in a general way. However, the manner of incorporating and supporting such transparent materials as may be employed, and the general location thereof, has been illustrated in Figures 1 and 2, and it is to be understood that in any of the forms such transparent material may be employed or may be mounted in any convenient manner, and various details of structure will be arranged in accordance with the designer's plan, that in itself forming no part of my invention. Also, while the enclosures have been illustrated as formed of transparent material, if desired armored sheathing may be employed for the better protection of the gunner, either partly or to the maximum extent permitted while still insuring that the gunner has proper sight of his target.

What I claim as my invention is:

1. In a mount for guns upon aircraft, in combination with an aircraft structure providing a support for the gunner, and terminating in an opening the edges of which define a vertical plane, a gun mount, a gun shield surrounding said gun mount and slotted for the projection of the gun, a shell supporting said shield and closing said opening, and itself apertured for protrusion of the shield, and mounted upon said aircraft structure for rotation about a horizontal axis, and means guiding the shield and gun mount for movement of the gun mount with respect to the shell about three axes at right angles to each other, and intersecting substantially in the axis of the gun barrel.

2. In a mount for guns upon an aircraft, in combination with the skin of an aircraft structure having an opening therein, a gun mount, an enclosure therefor protruding from the skin through said opening and closing the latter, means supporting said enclosure directly from the aircraft structure and restricting movement thereof relative to its supporting structure to swinging about a single axis only, lying substantially in the edge of the opening in the skin of the supporting aircraft structure, the enclosure being of circular cross-section normal to such axis, and means supporting said gun mount for the projection of a gun through the enclosure, and for movement with the latter.

3. In a mount for guns upon aircraft, in combination with the skin of an aircraft structure having an opening therein, a gun mount, an enclosure therefor protruding from the skin through said opening and closing the latter, means supporting said enclosure directly from the aircraft structure and restricting movement thereof relative to its supporting structure to swinging about a single axis only, lying substantially in the edge of the opening in the skin of the supporting aircraft structure, the enclosure being of circular cross-section normal to such axis, means supporting said gun mount for the projection of a gun through the enclosure, and for movement with the latter, and means guiding said gun mount for rotational movement with respect to said enclosure about an axis intersecting the first axis.

4. In combination with an aircraft fuselage terminating as a circular body in a plane substantially normal to the direction of flight, and having a circular aperture therein substantially conterminous with the fuselage end, a shell closing such aperture, means guiding said shell for rotation with respect to the fuselage about an axis parallel to the direction of flight, a gunner's support in the fuselage fixed relative thereto, and a gun projecting from said shell and movable therewith, and with respect thereto.

5. In a mount for guns upon aircraft, in combination with an aircraft structure having a circular opening therein, a substantially hemicpherical shell having a base of a size complemental to said opening, means guiding said shell for rotation about an axis through the center of its base and normal thereto, said shell having a circular aperture therein disposed eccentrically of its rotative axis, a gun mount, an enclosure therefor received in said aperture, a trunnion support for said enclosure extending diametrically across such aperture and secured by each end directly to said shell for restricting movement of said enclosure relative to the shell to swinging about a single axis only, lying substantially in the surface of said shell, and means supporting said gun mount for projection of a gun through said enclosure.

6. In a mount for guns upon aircraft, in combination with an aircraft structure having a circular aperture therein, a substantially hemispherical shell having a base of a size complemental to said aperture to close the same, means guiding said shell for rotation about an axis through the center of its base and normal thereto, said shell having a substantially circular aperture therein disposed eccentrically of its rotative axis, a gun mount, a slotted spherical shield substantially filling said eccentrically placed aperture and enclosing said gun mount, means restricting movement of said shield relative to said shell to swinging about a single axis only, lying substantially in the surface of said shell, and means supporting said gun mount for swinging movement relative to said shield, to move a gun along its slot.

7. In combination with an aircraft body terminating in an aperture the edges of which lie substantially in a single plane extending transversely of the direction of flight, a shell received in such aperture to constitute a terminal closure therefor in continuation of the aircraft body, means interengaged directly between said shell and the aircraft body, guiding the shell for rotation with respect to the aircraft body, a gun mount to support a gun projecting from said shell, means supporting said gun mount for movement with and also with respect to said shell, and a gunner's support independent of said shell, to support the gunner directly from the aircraft body for operation of the gun supported by said gun mount.

8. In combination with an aircraft body terminating in an opening the edges of which lie substantially in a single plane extending transversely of the direction of flight, a shell received in such opening to constitute a closure therefor in continuation of the aircraft body, a gun mount to support a gun projecting from said shell, a gunner's support carried by the aircraft body, for a gunner manipulating a gun which is supported by said gun mount, and means interengaged directly between said shell and the aircraft body, guiding the shell for rotation with respect to said gunner's support and the aircraft body.

9. In combination with an aircraft body terminating in an opening extending transversely of the direction of flight, a shell received in such opening to constitute a closure therefor in continuation of the aircraft body, and having an aperture therein, a gun shield received in and closing such shell aperture, a gun mount disposed behind said shield to support a gun projecting from said shield, a gunner's support carried by the aircraft body, independent of the shell, for a gunner manipulating a gun which is supported by said gun mount, and means supporting said shell from the aircraft body and guiding it for rotation with respect to said gunner's support and the aircraft body.

10. In combination with an aircraft body terminating in a circular opening defining a plane, a substantially hemispherical shell closing such opening and having a substantially circular aperture in the side thereof between its base and its dome, a sphere received in and closing the shell aperture, means guiding said shell in the opening for rotation with respect to the aircraft body, to afford orbital movement to said sphere, a trunnion support extending diametrically across said sphere and aperture and secured by each end directly to said shell and guiding said sphere for swinging with respect to said shell, and a gun mount to support a gun projecting from said sphere and swingable with the latter.

11. In combination with an aircraft structure terminating in a substantially circular opening which extends transversely of the direction of flight, a shell in the form of a body of revolution constituting a terminal closure for such opening, means supporting said shell directly upon the aircraft structure and guiding it for rotation about its generating axis, said shell having an aperture therein disposed eccentrically of such axis, a shield closing such shell aperture, a gun mount disposed behind said shield to support a gun projecting therethrough, and a gunner's support carried by the aircraft structure, independently of said shell and shield.

12. An aircraft gun emplacement comprising a sphere, a gun mount within the sphere, pivot means extending diametrically inward from the sphere and supporting said gun mount for traversing movement of a gun carried by such mount in a central plane of said sphere, a shell in the form of a body of revolution having an aperture therein disposed eccentrically of its generating axis, of a size to receive said sphere, pivot means extending diametrically outward from said sphere, lying in said central plane, and supporting said sphere from said shell for elevational movement with the gun mount and with respect to the shell, and means supporting said shell for rotation about its generating axis to afford bodily orbital movement of said sphere about the shell's rotative axis.

13. In combination with an aircraft structure terminating in a substantially planar circular opening, a shell in the form of a body of revolution about an axis through the center of and normal to the plane of such opening, means supporting said shell from the aircraft structure and guiding it for revolution about its generating axis, said shell having an aperture therein disposed eccentrically of such axis, a sphere received in and closing such shell aperture, a gun mount supported by and received within said sphere to support a gun projecting therefrom, and pivot means extending diametrically outward from said sphere to support said sphere and gun mount for swinging relatively to the shell, and for revolution therewith.

14. In combination with an aircraft body terminating in a circular aperture defining a plane extending transversely of the direction of flight, a shell in the form of a body of revolution about an axis substantially parallel to the direction of flight, to constitute a terminal closure for the body aperture in continuation of the aircraft body, means guiding said shell in the aperture for rotation about such axis, a gun mount to support a gun projecting from said shell and rotatable therewith about said axis, and a gunner's support carried by the aircraft body, independent of the shell.

15. In combination with an aircraft body terminating in an opening, means comprising an enclosure received in and closing such opening, pivot means disposed generally parallel to such opening and extending transversely of said enclosure to engage the aircraft structure at each side of said enclosure, for swinging of the enclosure relatively to the aircraft structure, said enclosure having therein a slot disposed coplanar with said pivot means, and of a width just sufficient to accommodate a gun barrel projecting therethrough, and a pivotal gun mount behind said enclosure to support a gun projecting through and for swinging along the slot.

16. In combination with an aircraft structure terminating in a substantially planar circular opening, a sphere received in and closing such opening, pivot means extending diametrically of said sphere and mounted on said aircraft structure parallel to the plane of such opening, supporting said sphere for swinging with respect to the aircraft structure, said sphere having therein a great circle slot disposed coplanar with said pivot means of a width just sufficient for projection of a gun barrel therethrough, and a pivotal gun mount received in said sphere to support a gun projecting through and for swinging along said slot.

17. In combination with an aircraft structure, an aircraft gun emplacement, comprising a shell, means supporting said shell from and guiding it for rotation relative to the aircraft structure, a ring supported from said shell in a position offset from the shell's axis of rotation, and pivoted to swing with respect to said shell about a diameter of the ring, a hollow sphere supported from said ring and slotted for projection therethrough of a gun, a gun mount received within said sphere, and means supporting said mount from said ring for swinging about a diameter of the ring at right angles to the first diameter and to the plane of the sphere slot.

18. In combination with an aircraft structure, an aircraft gun emplacement, comprising a shell, means supporting said shell from and guiding it for rotation relative to the aircraft structure, a ring supported from said shell in a position offset from the shell's axis of rotation, and pivoted to swing with respect to said shell about a diameter of the ring, a hollow sphere supported from said ring and slotted for projection therethrough of a gun, a two-part ring, including an outer ring part and an inner ring part relatively circumferentially shiftable, disposed within said first ring, pivot means supporting said outer ring part from said first ring for swinging about a diameter of the first ring at right angles to the first diameter and to the plane of the sphere slot, all said rings being disposed, in all positions, in central planes of said sphere, and a gun mount received within said sphere and rigidly supported from said inner ring part.

19. Means to support a machine gun or the like upon an aircraft structure, comprising a gun mount whereon the gun is secured in a neutral horizontal position, directed lengthwise of the aircraft structure, means supporting the gun mount for universal rotational movement from such neutral position about a center, disposed substantially in the axis of the gun barrel, which center is defined by the intersection of three axes, namely one extending lengthwise of the gun barrel in all positions thereof, one extending normally horizontally transversely through the gun barrel, and one extending normally vertically transversely through the gun barrel; a globular shield supported for movement with the gun about only one of the two axes last mentioned, and slotted for relative movement of the gun about the other of said two last mentioned axes, the gun mount supporting means including members interposed between said shield and said gun mount for swinging about such other axis, and a shell having an aperture for the protrusion of said shield, and closely surrounding the same, the shell being supported from the aircraft structure for rotational movement about a longitudinal horizontal axis which is offset laterally from and substantially parallel to the axis of the gun barrel when the latter is in its neutral position, whereby, by rotation of the gun mount about the first mentioned axis and by rotation simultaneously of the shell about its axis, the gun may be kept upright and in parallelism with its neutral position while thus moved orbitally about the axis of the shell, and may in any orbital position be moved about each of the two last mentioned axes and by the specified movements of the gun mount relative to the shield and of the latter relative to the shell.

20. In combination with an aircraft structure of generally circular cross-section and streamline shape, terminating at one end in an opening the edges of which define a substantially vertical transverse plane, such aircraft structure adjacent such opening constituting a gunner's support, means to support and permit aiming of a machine gun or the like by a gunner supported by such aircraft structure, comprising a gun mount whereon the gun is secured in a neutral horizontal position, directed lengthwise of the aircraft structure, means supporting the gun mount from the aircraft structure, for rotational movement about four axes (and universally about a center defined by the intersection of three such axes), namely (a) one extending lengthwise of the gun barrel, in all positions thereof, (b) one extending normally horizontally transversely through the gun barrel, (c) one extending normally vertically transversely through the gun barrel, the intersection of axes (a), (b), and (c), within the gun barrel, defining the center of the gun's universal movement, and (d) one which is parallel to the neutral position of the gun but laterally offset therefrom, whereby the gun and its center of universal movement has orbital movement about axis (d), and the gun may be maintained upright by movement about axis (a) corresponding to its movement about axis (d), and may be trained in elevation and azimuth in any such adjusted position by movement about axes (b) and (c), and shielding means to substantially close the opening in the aircraft structure, supported from the latter and movable in accordance with movement of the gun, and protecting the gunner from the airstream.

21. In combination with an aircraft structure having an opening in its skin for the projection of a gun, which aircraft structure constitutes a gunner's support, means to support and permit aiming of a machine gun or the like by a gunner supported by such aircraft structure, comprising a gun mount whereon the gun is secured, means supporting the gun mount from the aircraft structure for universal rotational movement about a center from a neutral, outwardly directed position, which center is disposed substantially in the axis of the gun barrel, and is defined by the intersection of three axes, namely one extending lengthwise of the gun barrel, in all positions thereof, one extending normally horizontally transversely through the gun barrel, and one extending normally transversely through the gun barrel and at right angles to the second mentioned axis, and shielding means carried by the aircraft structure, and closing the opening therein, said shield ing means being supported for rotational movement at all times about only one of the two axes last mentioned, and such shielding means surrounding the gun mount and being slotted for projection of the gun's muzzle, for relative movement of the gun about the other of the two axes last mentioned, the gun mount being rotatable about the first mentioned axis relative to said shielding means.

22. In combination with an aircraft structure having an opening in its skin for the projection of a gun, which aircraft structure constitutes a gunner's support, means to support and permit aiming of a machine gun or the like by a gunner supported by such aircraft structure, comprising a gun mount whereon the gun is secured, means supporting the gun mount from the aircraft structure for universal rotational movement about a center from a neutral, outwardly directed position, which center is disposed substantially in the axis of the gun barrel, and is defined by the intersection of three axes, namely, one extending lengthwise the gun barrel, in all positions thereof, one extending normally horizontally transversely through the gun barrel, and one extending normally transversely through the gun barrel and at right angles to said second mentioned axis, and said means further supporting the gun mount from the aircraft structure for disposition of such center of rotation in a plurality of orbitally related positions, and shielding means carried by the aircraft structure, and closing the opening therein to preserve substantial continuity of surface of the aircraft structure, said shielding means including a member supported for rotational movement at all times about only one of the two axes last mentioned, and such shielding means surrounding the gun mount and being slotted for projection of the gun's muzzle, for relative movement of the gun about the other of the two last mentioned axes, the gun mount being rotatable about the first mentioned axis relative to said shielding means, and such universal movement of the gun about all of said axes being permitted in any adjusted position of its center of rotation.

23. In combination with an aircraft structure of generally streamline shape terminating at one end in an aperture in its skin disposed transversely of the line of flight, an enclosure closing such aperture, the skin whereof constitutes a smooth continuation, in the line of flight, of the aircraft structure's skin, means interengaged directly between said enclosure and the aircraft structure, guiding the enclosure for rotation with respect to said aircraft structure about one axis only, a gun mount to support a gun projecting from the enclosure, means supporting said gun mount for movement with and also with respect to said enclosure, and a gunner's support independent of said enclosure, to support the gunner directly from the aircraft structure for operation of the gun supported by said gun mount.

24. In an aircraft structure, a shell carried by the aircraft structure and rotatable relative thereto, said shell having an opening therein, a gun mount comprising a member mounted on said shell for rotation about an axis transverse with respect to the axis of rotation of said shell, a second member mounted on said first mentioned member for rotation about an axis at right angles to the axis of rotation of said first mentioned member, a third member mounted on said second mentioned member for rotation about an axis at right angles to the axis of rotation of said second mentioned member, a gun mounted on said third member, the axes of rotation of said members intersecting in the axis of the gun barrel, said point of intersection being disposed eccentrically with respect to the axis of rotation of the shell, and a shield carried by said first mentioned member for movement therewith and effective to substantially close the opening in said shell in any operative rotated position of said first mentioned member relative to said shell.

25. In an aircraft structure, a shell carried by the aircraft structure and rotatable relative thereto, said shell having an opening therein, a gun mount comprising a member mounted on said shell for rotation about an axis transverse with respect to the axis of rotation of said shell, a second member mounted on said first mentioned member for rotation about an axis at right angles to the axis of rotation of said first mentioned member, a third member mounted on said second mentioned member for rotation about an axis at right angles to the axis of rotation of said second mentioned member, a gun mounted on said third member, the axes of rotation of said members intersecting in the axis of the gun barrel, said point of intersection being disposed eccentrically with respect to the axis of rotation of the shell, and a shield carried by said first mentioned member for movement therewith and effective to substantially close the opening in said shell in any operative rotated position of said first mentioned member relative to said shell, said shield having a slot through which the gun barrel projects and which is elongated in a direction to permit swinging of the gun when the second mentioned member is rotated relative to the first mentioned member.

JOHN C. SANDERS.